United States Patent Office 3,547,593
Patented Dec. 15, 1970

3,547,593
REACTOR FOR FLUID FILMS
Viktor Markovich Olevsky, Leningradsky prospekt 75-a, kv. 91, and Vitaly Rafael-Abovich Ruchinsky, Ulitsa Vavilova 34/4, korpus V, kv. 245, both of Moscow, U.S.S.R.
Filed Mar. 3, 1967, Ser. No. 620,372
Int. Cl. B01d 1/22
U.S. Cl. 23—283
3 Claims

ABSTRACT OF THE DISCLOSURE

Within a cylindrical heat exchanger is arranged a rotor having one or more sleeves axially distributed and provided with longitudinally extending grooves in which openings are located. Fluids are distributed from plates into the grooves to be distributed through the openings onto the inner surface of the heat exchanger.

---

The present invention relates to apparatus for carrying out chemical and physico-chemical reactions in a film of liquid, and particularly for carrying out exothermic reactions of short duration in a liquid phase. Apparatus of this kind is widely used in chemical, pharmaceutical and food industries.

In a known type of apparatus for carrying out reactions in a film of liquid the liquid mixture of components is distributed over the vertical heat-exchange surface of the housing by means of a rotor mounted within the housing on a vertical shaft. The mixture of the components is fed to an applying device mounted on the vertical rotary shaft in the upper portion of the apparatus, wherefrom it is discharged by centrifugal forces upon the heat-exchange surface of the housing to descend therealong by gravity in the form of a film.

In this known type of apparatus it is impossible to feed the components upon the heat-exchange surface separately, and, therefore, it is also impossible to prevent undesirable interaction between the components outside this surface. (cf. for example, the German magazine "Chemische Technik," volume 15, No. 11, pp. 645–650, 1963).

It is, therefore, an object of the present invention to create an apparatus for carrying out reactions in a film of liquid, in which provisions should be made for applying the components separately upon the heat-exchange surface.

With this and other objects in view an apparatus for carrying out chemical and physico-chemical reactions in a film of liquid, according to the present invention, comprises a housing, a shaft mounted for rotation within said housing, at least one applying device for discharging the components separately upon the heat exchange surface of said housing, for subsequent mixing of said components on said heat exchange surface; said device including a vertically grooved hollow drum with perforations therethrough, mounted on said shaft, said drum acting as a rotor; a plurality of annular discs mounted in a vertically spaced concentric relation within said drum, the number of said discs being equal to the number of the components; said annular discs having openings in their peripheral surfaces facing the wall of said drum, said openings being adapted to discharge the respective components upon the internal wall of said drum without said components being mixed; and means for supplying the respective components separately to said discs.

In a preferred embodiment of the present invention the means for supplying the components to the respective annular discs may comprise a plurality of sleeves, the number of said sleeves being equal to the number of the components, said sleeves being co-axial in relation to and rotating together with said shaft; and a plurality of stationary cylinders, also equal in number to the number of the components, said cylinders being mounted co-axially; said sleeves having openings therethrough for discharging the components upon the internal walls of said cylinders.

In an apparatus embodying the present invention it is also desirable that the openings in the peripheral surface of each one of said annular discs should be angularly displaced in relation to the openings of the other discs, for individual components to be applied into different vertical grooves of the drum, i.e. for the successive grooves of the drum to receive different components.

Other objects and advantages of the present invention will be made apparent in the following detailed description of an embodiment thereof, due reference being had to the accompanying drawings, in which.

Figure 1:
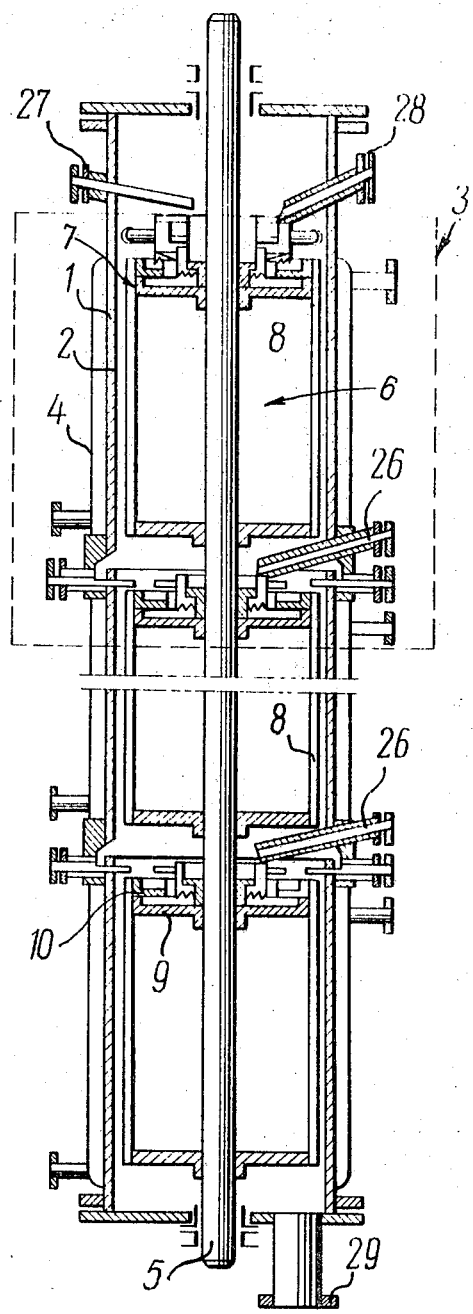
FIG. 1 is a longitudinal sectional view of an apparatus for carrying out reactions in a film of liquid, embodying the present invention.
Figure 2:
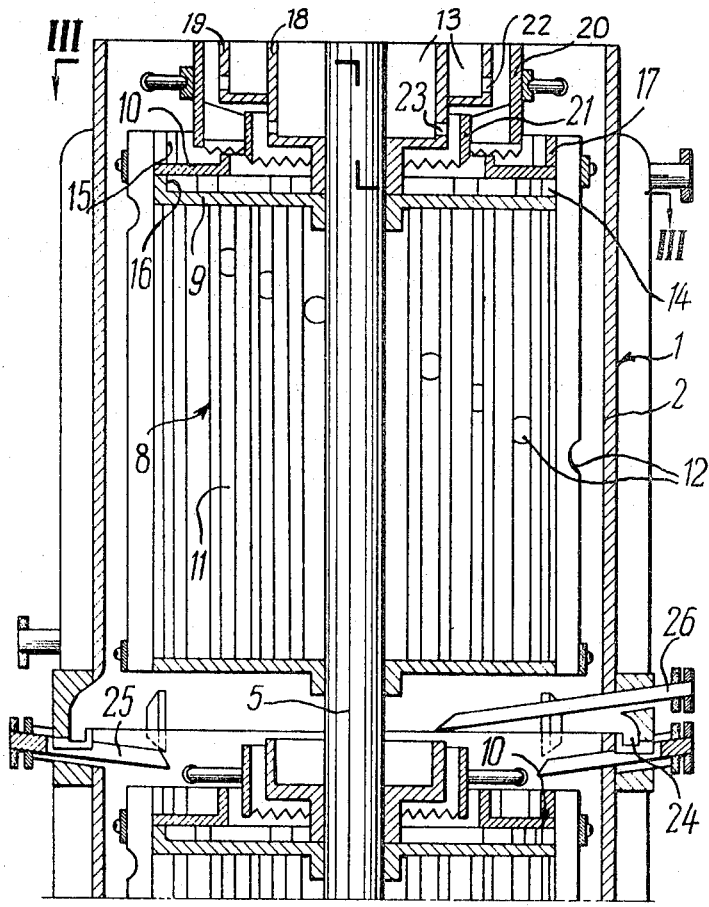
FIG. 2 is a longitudinal sectional view of one of the constituent sections of the apparatus, as shown in FIG. 1.

Referring now to the drawing, FIG. 1 shows an apparatus embodying the present invention and having a vertical cylindrical housing 1 with a heat exchange surface 2, said housing comprising a plurality of identical sections 3. The number of these sections 3 is chosen to correspond to the specific requirements of a particular chemical process to be carried out. Each section 3 has an external hollow wall 4 for the circulation of fluid supplying heat to or withdrawing it from the heat exchange surface. Extending through all the sections 3 of the apparatus is the shaft 5 of the rotor 6, coaxial with the sections. The rotor 6 carries distributing or applying devices 7 for separate discharge of individual components upon the heat exchange surface 2 of the housing 1, for subsequent mixing of the components on this surface. Each one of the applying devices 7 corresponds to the respective section 3. Each device 7 (FIG. 2) comprises a grooved drum 8 and annular discs 9 and 10, concentrically mounted upon the shaft 5, the number of the discs corresponding to the number of components to take part in the reaction. In the embodiment shown two annular discs 9 and 10 are fixedly secured on the shaft 5 in vertically spaced relationship.

Figure 3:
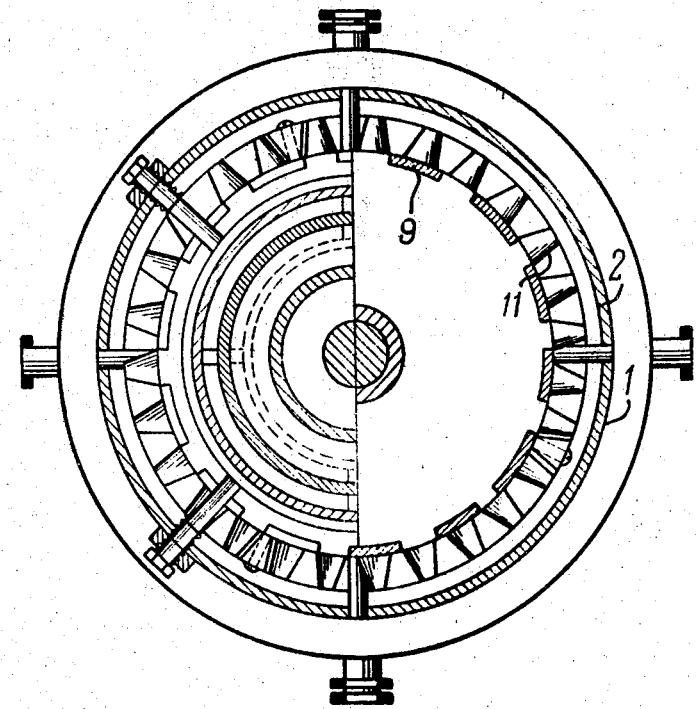
FIG. 3 is a sectional view taken along line III—III of FIG. 2.

The drum 8 is provided with internal vertical grooves 11, with openings 12 made through the crests of said grooves, the openings 12 being arranged along a descending helical line and being adapted for discharging the components separately under centrifugal forces upon the heat exchange surface 2 of the housing 1. A circle connecting the bottoms of the grooves 11 (FIG. 3) coincides with the greater circles of the discs 9 and 10.

For feeding a component to the respective disc 9 or 10 an applying device 13 (FIG. 2) is provided.

For discharging the components separately upon the internal surfaces of the drums 8, without the components being pre-mixed with each other, the annular discs 9 and 10 are provided with openings 14 and 15 in their vertical rims 16 and 17, respectively, said rims extending along the greater circles of the discs 9 and 10.

Further on, for the individual components discharged from the openings 14 and 15 to reach the heat exchange surface 2 without being mixed with each other, the openings 14 in the rim 16 of the annular disc 9 are angularly displaced in relation to the openings 15 in the rim 17 of the annular disc 10, for each of the openings 14 and 15 to face a corresponding groove 11 of the drum 8.

Each of the applying devices 13 includes coaxial sleeves 18 and 19 rotating together with the shaft 5, and coaxial stationary cylinders 20 and 21.

The sleeves 18 and 19 have different diameters, the smaller sleeve 18 being received within the larger sleeve 19, and the bottom of the sleeve 18 being disposed lower than the bottom of the sleeve 19. The number of the sleeves and their respective stationary cylinders is chosen to correspond to the number of the components. The sleeves 18 and 19 are provided with openings 22 and 23 in their walls for discharging the respective components upon the internal walls of the stationary cylinders 20 and 21. The cylinders 20 and 21 also have different diameters and are vertically displaced in relation to each other.

Mounted in the housing 1 intermediate the adjacent drums 8 are annular collectors 24 with troughs 25 inclined toward the central axis of the apparatus. The troughs 25 serve to feed the liquid upon the annular disc 10 of the underlying drum 8. Troughs 26 for feeding additional components into the apparatus are uniformly disposed around the circumference of the housing 1, above the troughs 25.

The apparatus operates in the following manner. The components to take part in the reaction are separately fed into the apparatus through inlets 27 and 28 (FIG. 1), wherefrom they are directed into the sleeves 18 and 19 (FIG. 2), respectively. Upon their rotation, the sleeves 18 and 19 discharge their components under centrifugal forces through openings 22 and 23 upon the respective internal walls of the stationary cylinders 20 and 21. Along these walls the liquid components flow down by gravity onto the rotating discs 9 and 10. Under centrifugal forces the components are discharged in the form of separate jets through respective openings 14 and 15 into the corresponding grooves 11 in the internal wall of the drum 8, and flow down therealong toward the openings 12. Upon reaching the openings 12, the components are discharged in separate streams onto the heat exchange surface 2 (FIG. 3) of the housing 1. It is now obvious that the components are allowed to mix on the heat exchange surface 2 alone, whereby any possibility of overheating is excluded in case of exothermic reactions. Thus, the reaction takes place in a liquid phase within a thin film flowing along the internal wall of the housing. The thickness of the film depends exclusively on the total quantity of the components being fed and the resultant viscosity of the mixture. Upon having passed the first in the series (i.e. the uppermost) section 3 (FIG. 1), the liquid is collected in the collector 24 wherefrom it flows along the troughs 25 upon the disc 10 of the underlying drum 8 and is again distributed over the heat exchange surface 2 of the housing 1, in a manner similar to the one described above for the first section. The apparatus design provides for additional supply of any one of the components into the second section, as well as into any one of the successive sections, by means of the respective trough 26. Such intermediate supply of any one of the components make it possible to control the rate of the reaction. The liquid product of the reaction is carried away from the lower portion of the housing through a connection 29.

Thus, an apparatus embodying the present invention provides for carrying out a chemical reaction in a liquid phase within a descending film of liquid, provisions being also made for accurate and efficient temperature control, be the reaction exothermic or endothermic one. Moreover, the process can be effected in stages, i.e. at varying temperatures, which might be essential for obtaining the maximum yield of the target product of the reaction.

Withdrawal or supply of heat through the wall of the housing is quite intensive since the liquid in the descending film is made highly turbulent by the streams discharged from the drum openings.

The use of centrifugal forces for distributing the liquid over the heat exchange surface of the apparatus provides for maintaining a sufficiently large clearance between the rotating drum and the internal wall of the housing. This, in turn, makes it possible to use commercial grades of sheet metal or pipes for the manufacture of the apparatus, with no need for their special finishing treatment, and also facilitates assembling and disassembling of the apparatus.

It has been experimentally proved that the degree of uniformity of distribution of the liquid over the heat exchange surface does not depend on the fluctuations in the feed of individual components, on varying conditions of heat withdrawal, etc.

As has been already explained, the turbulency of the liquid film intensifies its heat exchange with the internal wall of the housing.

We claim:
1. Apparatus for carrying out reactions in a film of liquid, said apparatus comprising a vertical housing having an inner surface, a vertical shaft mounted coaxially in said housing, a distributing device in said housing for separate supply of components across the height of the inner surface of the housing for subsequent mixing on said surface; said distributing device comprising a hollow drum secured to said shaft for rotation therewith and having walls with internal vertical grooves therein and with holes in said walls at the crests of the grooves, said holes being arranged in said walls along a helical line; a plurality of annular discs equal in number to the number of the components of the reaction, said discs being disposed inside said drum in concentric, vertically spaced relationship, said discs having upstanding rims with circumferentially spaced openings therethrough, said circumferentially spaced openings in the rim of each said disc being angularly displaced in relation to the circumferentially spaced openings in the respective rims of the other of said discs, said openings facing separate longitudinal grooves of said grooved drum for discharging said components into the separate grooves on the internal surface of said drum without mixing said components; and feed means for supplying said components separately upon the respective annular discs.

2. An apparatus, as claimed in claim 1, in which said feed means for supplying said components upon said annular discs comprise a plurality of sleeves, one for each of said components, said sleeves being coaxially mounted on said shaft for rotation therewith, and a plurality of coaxially disposed stationary cylinders, one for each of said components, said sleeves having openings therethrough for discharging said components upon the internal walls of said cylinders.

3. An apparatus as claimed in claim 1 in which said openings in the rims are arranged such that the respective components are received by at least every other groove of said drum.

References Cited
UNITED STATES PATENTS 2,955,990  10/1960  Smith _____ 202—236X JAMES H. TAYMAN, Jr., Primary Examiner U.S. Cl. X.R.

23—285, 1, 252; 202—236; 159—6; 165—174